United States Patent
Masoni et al.

(10) Patent No.: US 8,292,046 B2
(45) Date of Patent: Oct. 23, 2012

(54) WHEEL CARRIER FOR VEHICLES WITH A DISC BRAKE

(75) Inventors: Paolo Masoni, Bergamo (IT); Leone Oberti, Lenna (IT)

(73) Assignee: Freni Brembo S.p.A., Curno (IT)

( * ) Notice: Subject to any disclaimer, the term of this patent is extended or adjusted under 35 U.S.C. 154(b) by 1016 days.

(21) Appl. No.: 11/921,178

(22) PCT Filed: May 31, 2005

(86) PCT No.: PCT/IT2005/000310
§ 371 (c)(1),
(2), (4) Date: Feb. 13, 2008

(87) PCT Pub. No.: WO2006/129327
PCT Pub. Date: Dec. 7, 2006

(65) Prior Publication Data
US 2009/0020376 A1   Jan. 22, 2009

(51) Int. Cl.
*F16D 65/12* (2006.01)
(52) U.S. Cl. .................. 188/218 XL; 188/18 A
(58) Field of Classification Search .......... 188/18 A, 188/18 R, 17, 71.6, 218 R, 264 A, 264 AA, 188/264 R, 218 XL; 301/6.1, 6.8, 105.1, 301/6.3; 384/589, 544
See application file for complete search history.

(56) References Cited

U.S. PATENT DOCUMENTS

| | | | | |
|---|---|---|---|---|
| 5,540,303 A | * | 7/1996 | Bodin et al. | 188/18 A |
| 5,988,613 A | * | 11/1999 | Dagh et al. | 267/161 |
| 6,095,617 A | * | 8/2000 | Bertetti | 301/6.8 |
| 6,485,188 B1 | * | 11/2002 | Dougherty | 384/589 |
| 6,564,912 B1 | * | 5/2003 | Koschinat | 188/218 XL |
| 6,722,479 B2 | * | 4/2004 | Baumgartner et al. | 188/218 XL |
| 7,111,911 B2 | * | 9/2006 | Baumgartner et al. | 301/105.1 |
| 7,413,261 B2 | * | 8/2008 | De Freitas | 301/105.1 |
| 7,866,447 B2 | * | 1/2011 | Baumgartner et al. | 188/71.1 |
| 2003/0066715 A1 | | 4/2003 | Baumgartner et al. | |
| 2003/0127290 A1 | * | 7/2003 | Severinsson et al. | 188/73.32 |
| 2007/0062766 A1 | * | 3/2007 | Leinung et al. | 188/71.8 |

FOREIGN PATENT DOCUMENTS

| | | |
|---|---|---|
| DE | 197 38 881 | 3/1999 |
| DE | 102 33 141 | 2/2004 |
| WO | WO 95/13198 | 5/1995 |
| WO | WO 2004/097243 | 11/2004 |

* cited by examiner

*Primary Examiner* — Robert A Siconolfi
*Assistant Examiner* — Mariano Sy
(74) *Attorney, Agent, or Firm* — Dickstein Shapiro LLP (57) ABSTRACT

A wheel carrier for providing a rotary connection between a wheel and the vehicle suspension. The wheel carrier includes a support member for supporting a braking band, a connection flange for supporting the wheel of the vehicle, a first connector for connecting the support member to the vehicle suspension and second connector for rotatably connecting the connection flange to the support member.

42 Claims, 12 Drawing Sheets

WHEEL CARRIER FOR VEHICLES WITH A DISC BRAKE

The object of the present invention is a wheel carrier intended to provide a rotary connection between a wheel and suspension means of a vehicle with a disc brake, particularly a heavy vehicle the wheel flange of which has an outside diameter which is greater than the inside diameter of the employed braking disc.

Usually, in these vehicles the replacement of the worn braking disc is carried out by disassembling the wheel bearing unit.

However, the bearings life, being generally longer than the braking discs, is guaranteed by the manufacturers only in the case where the bearings are never disassembled after the first assembling thereof.

Therefore, the need for providing braking systems allowing the braking disc to be replaced without disassembling the bearing unit is felt.

In order to solve this need some solutions have been proposed which, though avoiding the bearing disassembling, yet suffer from other drawbacks. For example systems, in which a wheel flange, a bell of the braking disc and an outer ring of the bearing initially separate from one another can be removably connected to one another by means of a sequence of screws providing a single "package" are known. This solution, described for example in the French patent application FR 2687614, though not requiring any action on the bearing while replacing the worn braking disc, suffers from the drawback of having a bell being somewhat large and not capable of being used again after the disc has been replaced.

In this solution two spigots have to be further provided, and i.e. a spigot of the disc on the bearing and a spigot of the wheel flange on the disc bell, thus requiring at least four labour- and time-consuming processing steps.

Furthermore, an optional use of axially sliding braking bands is made hard and expensive by a large number of parts to be manufactured and assembled.

While performing hard brakings, the known wheel carrier further shows undesired deformations and thus requires a large-sized, and hence heavy, braking disc bell.

Moreover, the alignment and assembling of the three separate parts—wheel flange, braking disc bell and bearing outer ring—are somewhat complicated operations requiring a lot of time.

Therefore, the object of the present invention is to provide a wheel carrier for vehicles of the above-mentioned type allowing the worn parts of the braking system to be replaced without acting on the bearing and overcoming the prior art drawbacks.

Within the scope of the object stated above the invention aims as a further task to provide a wheel carrier having such characteristics as to uniformly stress the main coupling members and to favour the easy and reliable replacement of the braking disc.

These and other objects are achieved by means of a wheel carrier intended to provide a rotary connection around an axis S between a vehicle wheel, which can be braked by means of a disc brake, and vehicle suspension means, in which the wheel carrier comprises:

a support member adapted to support a braking band,
a connection flange adapted to support said vehicle wheel, in which the supporting structure and the connection flange are two separate parts,
first connecting means in order to connect the support member to the suspension means;
second connecting means in order to removably connect the connection flange to the support member,
in which the first connecting means and the second connecting means are functionally separate from one another, such that the connection between the connection flange and the support member is independent from the connection between the support member and the suspension means.

In order to better understand the invention, the description of an exemplary, non-limiting embodiment thereof is given herein below, as shown in the annexed drawings, in which.

With reference to the figures, a wheel carrier has been indicated with reference 1 as a whole. The wheel carrier 1 is intended to provide a rotary connection around an axis S between a vehicle wheel (not shown), which can be braked by means of a disc brake, and vehicle suspension means (not shown). The wheel carrier 1 comprises a support member 2 adapted to support a braking band 3 and which can be connected to the vehicle suspension, i.e. the spindle, by means of first connecting means. The wheel carrier further comprises a connection flange 4 adapted to support the vehicle wheel. The support member 2 and the connection flange 4 are two separate parts, which can be removably connected to each other by means of second connecting means.

Advantageously, the first connecting means and the second connecting means are functionally separate from one another, such that the connection between the connection flange 4 and the support member 2 is independent from the connection between the support member 2 and the suspension means.

Herein below, the terms "axial" and "radial" refer to the rotation axis of the individual components (braking disc, wheel, bearing outer ring, support member, connection flange) when they are mounted on the vehicle. This rotation axis substantially coincides with the symmetry axis S, or the axial-symmetry axis as specified herein below, of said components. On the other hand, the terms "hub side" and "wheel side" refer to the orientation of the components when the latter are mounted on the vehicle.

The support member 2 is a substantially toroidal tubular body expanding around the axis S and comprises a radially outer surface 5 forming a seat 6 for accommodating the braking band 3 and a radially inner surface 7 forming at least one seat 8, 9 for connecting the support member 2 and at least one bearing 10, 11 to each other, thus providing said first connecting means.

Advantageously, the support member 2 comprises a first seat 8 for accommodating the outer ring 12 of a first bearing 10 and a second seat 9 for accommodating the outer ring 13 of a second bearing 11. The first 8 and second 9 seats are axially opposite to each other, such that the first bearing 10 can be inserted into the first seat 8 from a wheel side 16 of the support member 2 and the second bearing 11 can be inserted into the second seat 9 from a hub side 17 of the support member 2 opposite the wheel side 16. The inner rings 14, 15 of the two bearings 10, 11 are splined on a vehicle spindle in a known manner, and the outer rings 12, 13 can be for example splined into the seats 8, 9 of the support member by means of either a shape- or interference-coupling.

On the wheel side 16 of the support member 2 there is provided a shoulder 18 with a planar abutment surface 19 being substantially perpendicular to the axis S and facing the wheel side 16 of the support member 2. The shoulder 18 is provided with a plurality of threaded holes 20 opening in the abutment surface 19 and being arranged aligned relative to corresponding through holes 33 of the connection flange 4. The threaded holes 20 and the through holes 33 are adapted to accommodate a plurality of screws 21 in order to provide said second connecting means between the connection flange 4 and the support member 2.

Advantageously, the threaded holes 20 and the through holes 33 are pitch-arranged along a circumference, the centre of the latter being on axis S.

On the wheel side 16 of the support member there is further provided at least one support portion 22 the shape of which being substantially complementary with the shape of a corresponding supported portion 31 of the connection flange 4. The supporting portion 22 is suitable to prevent the connection flange 4 from moving relative to the support member 2 in at least one transversal direction, preferably in all the directions being transversal to the axis S.

In accordance with an embodiment, the support portion 22 comprises one or more projections being located near the threaded holes, preferably a tubular projection being substantially cylindrical and centered relative to the axis S, the diameter thereof being smaller than the diameter of a circle along which the threaded holes 20 are located.

The seat 6 accommodating the braking band 3 has such a shape as to allow the braking band 3 to be inserted from the wheel side 16 onto the support member 2 when the connection flange 4 is separate from the latter. The seat 6 comprises an engaging surface 23 being grooved and suitable to engage a substantially complementary surface 35 of the braking band 3 in order to rotatably integrally connect the braking band 3 and the support member 2 to each other around the axis S.

In accordance with an embodiment, the seat 6 further comprises a striking surface 24 being transversal to the axis S and defining an engaging position of the braking band 3 in the seat 6. The striking surface restricts the axial displacement of the braking band 3 towards the hub side 17 of the support member 2.

Advantageously, the seat 6 accommodating the braking band 3 comprises one or more cooling ducts 25 allowing the air to be conveyed from outside the seat 6 up to the engaging position between the seat 6 and the braking band 3. The cooling ducts 25 comprise grooves provided in the engaging surface 23 which axially extend outside the seat 6.

Figures 1, 2, 3:
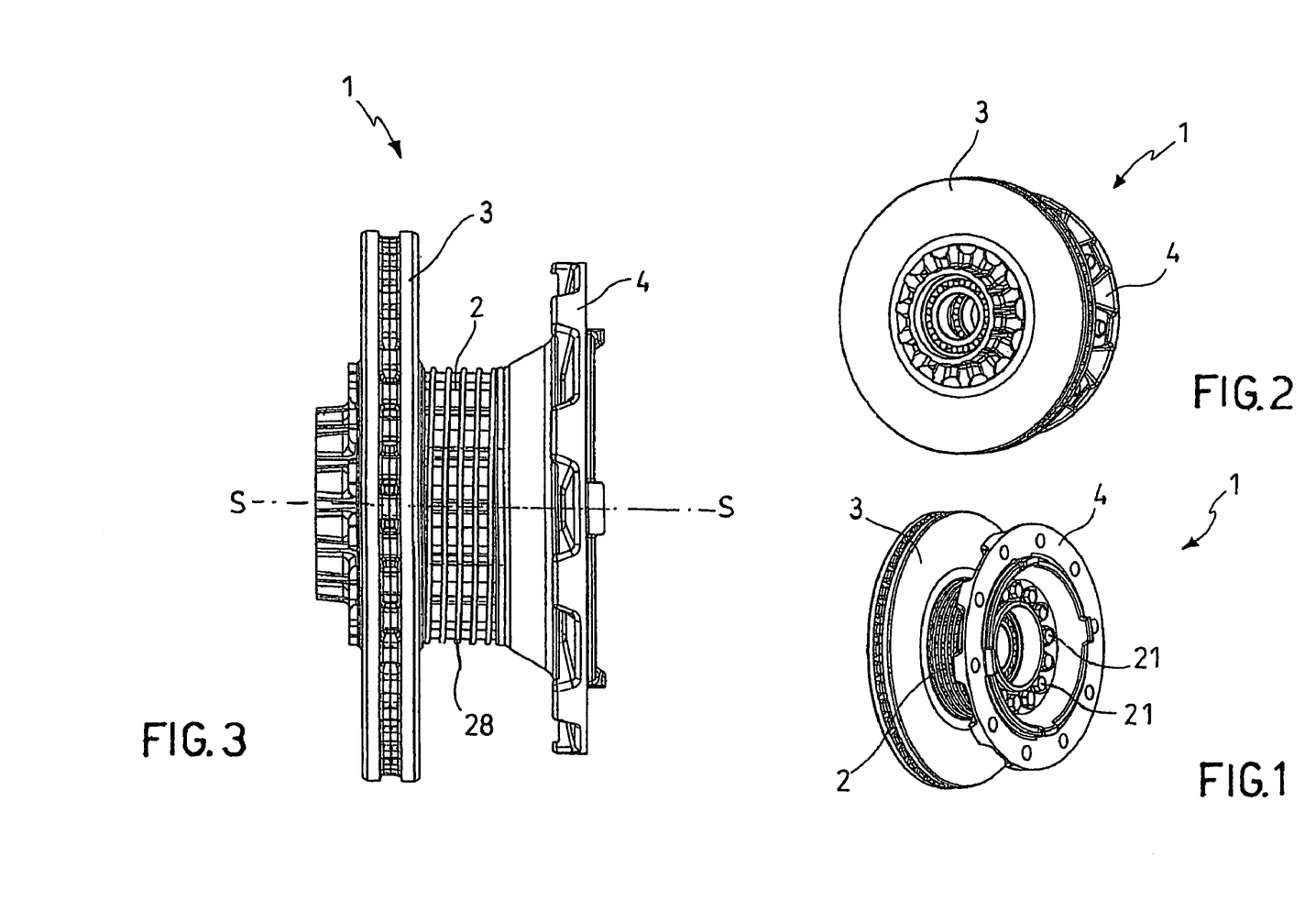
FIGS. 1 and 2 are perspective views of a wheel carrier unit according to the invention.
FIG. 3 is a side view of the wheel carrier unit from FIG. 1.
Figure 4:
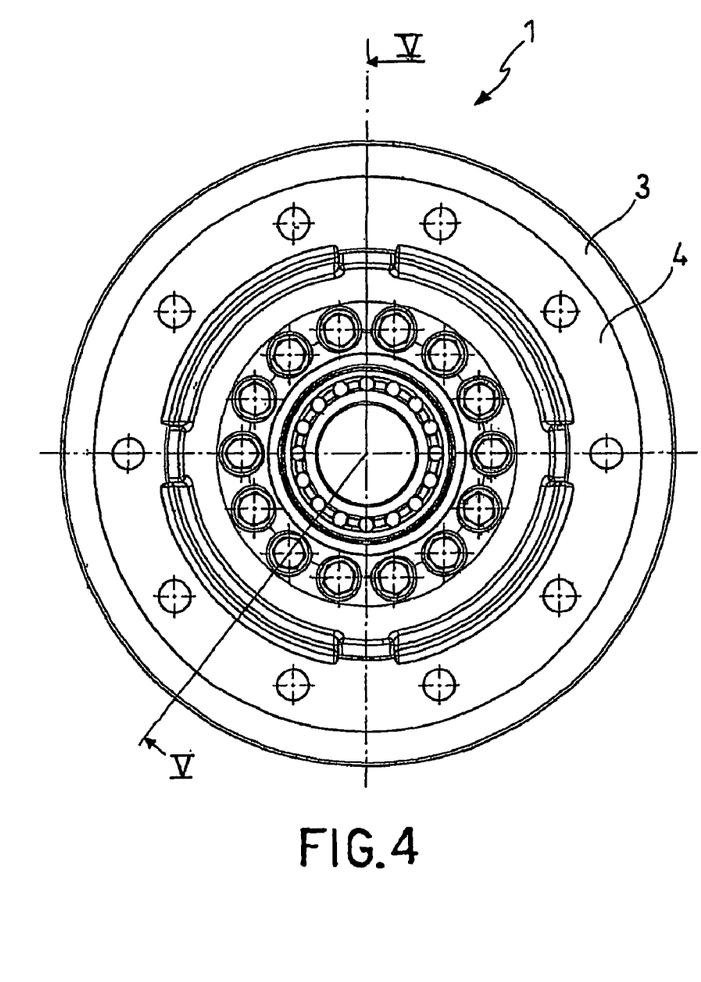
FIG. 4 is a front view of the wheel carrier unit from FIG. 1.
Figure 5:
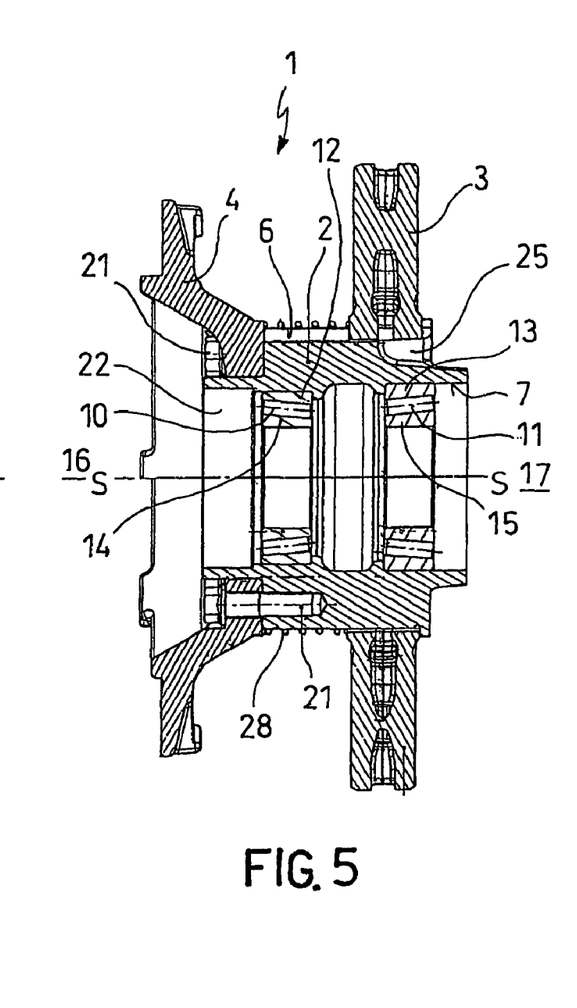
FIG. 5 is a sectional view according to line V-V from FIG. 4.
Figures 6, 7:
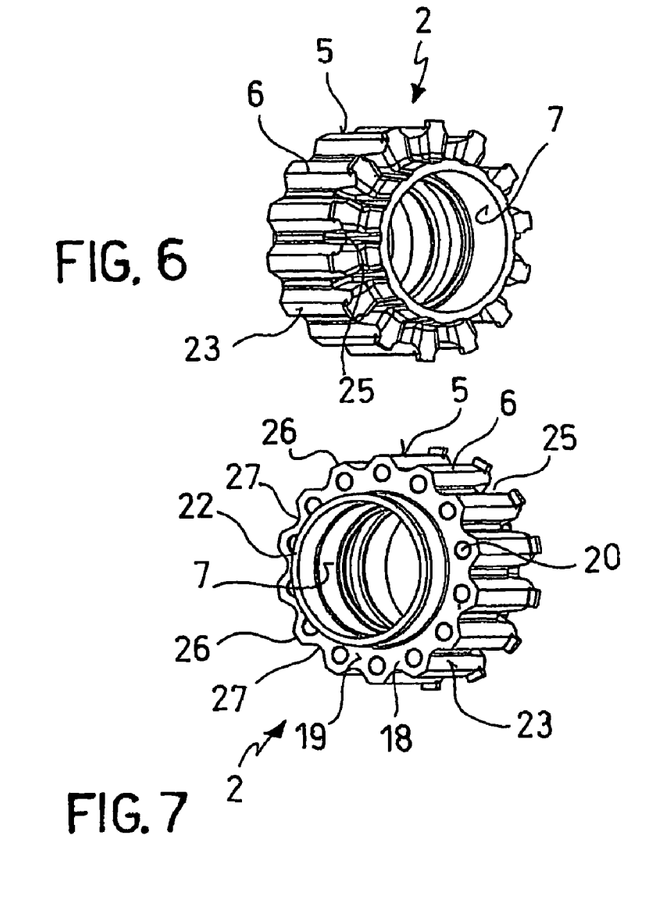
FIGS. 6 and 7 are perspective views of a support member of the wheel carrier unit according to the invention.
Figure 8:
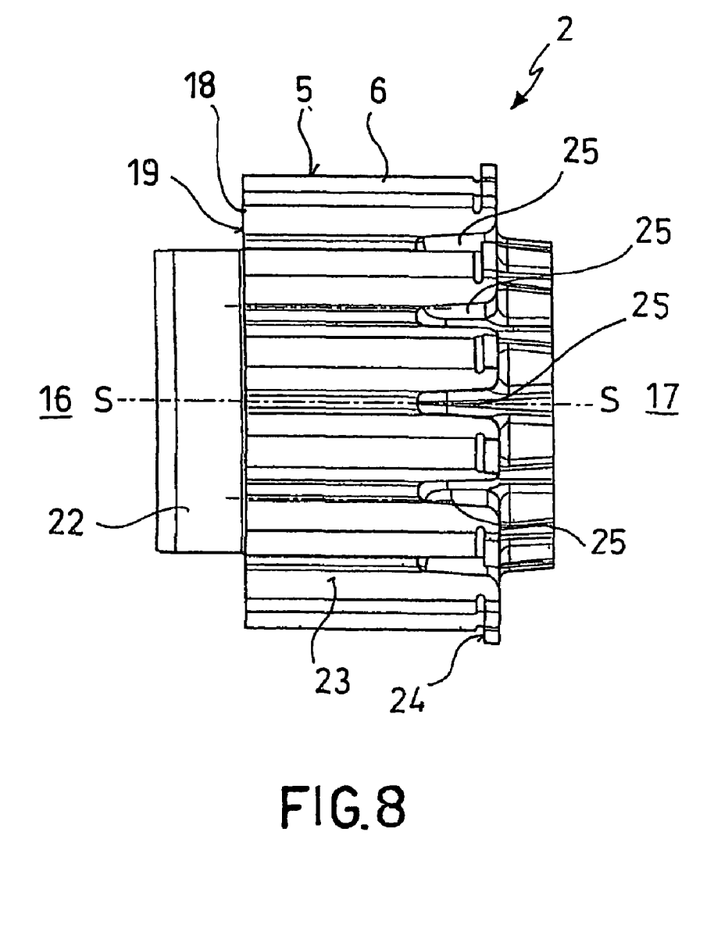
FIG. 8 is a side view of the support member from FIG. 6.
Figure 9:
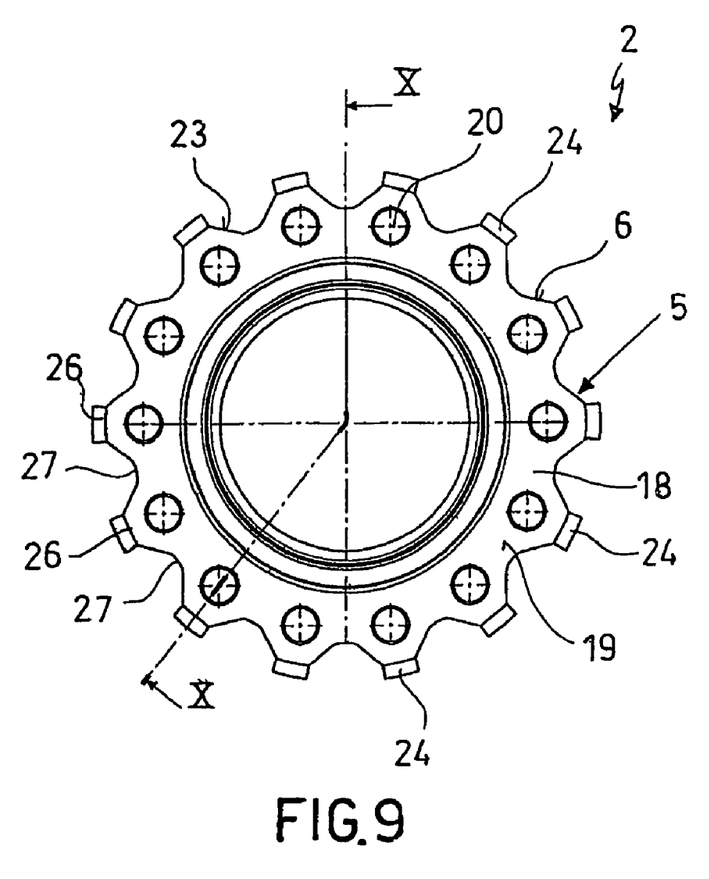
FIG. 9 is a rear view of the support member from FIG. 6.
Figure 10:
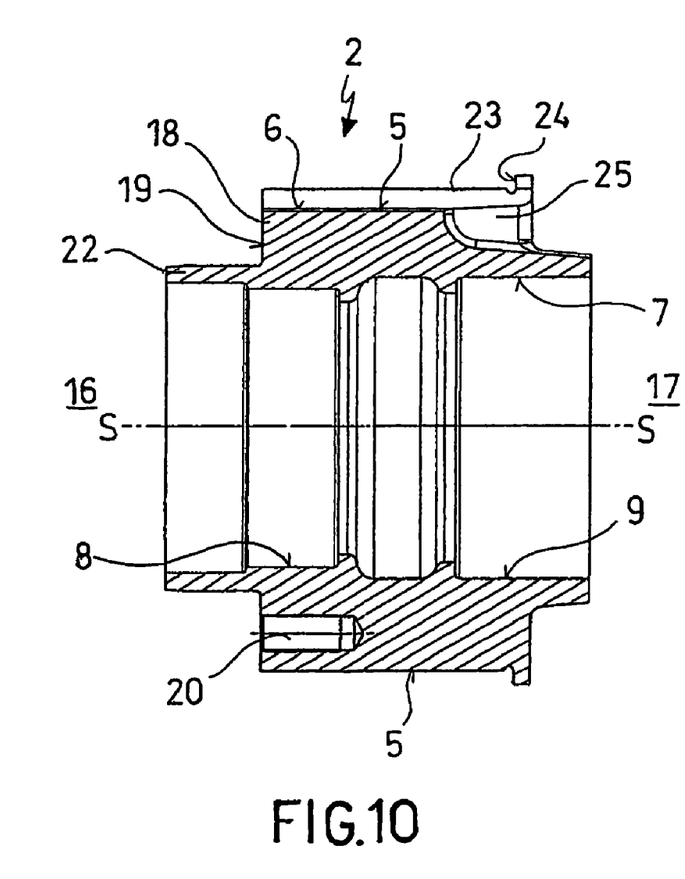
FIG. 10 is a sectional view according to line X-X from FIG. 9.
Figure 11:
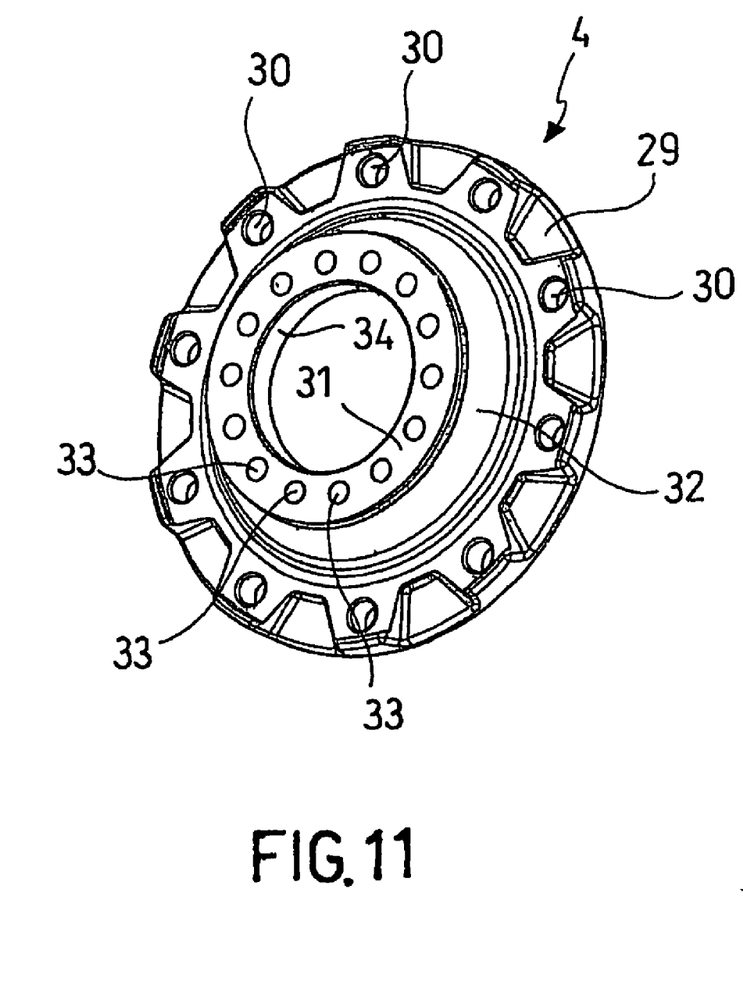
FIG. 11 is a perspective view of a connection flange of the wheel carrier unit according to the invention.
Figure 12:
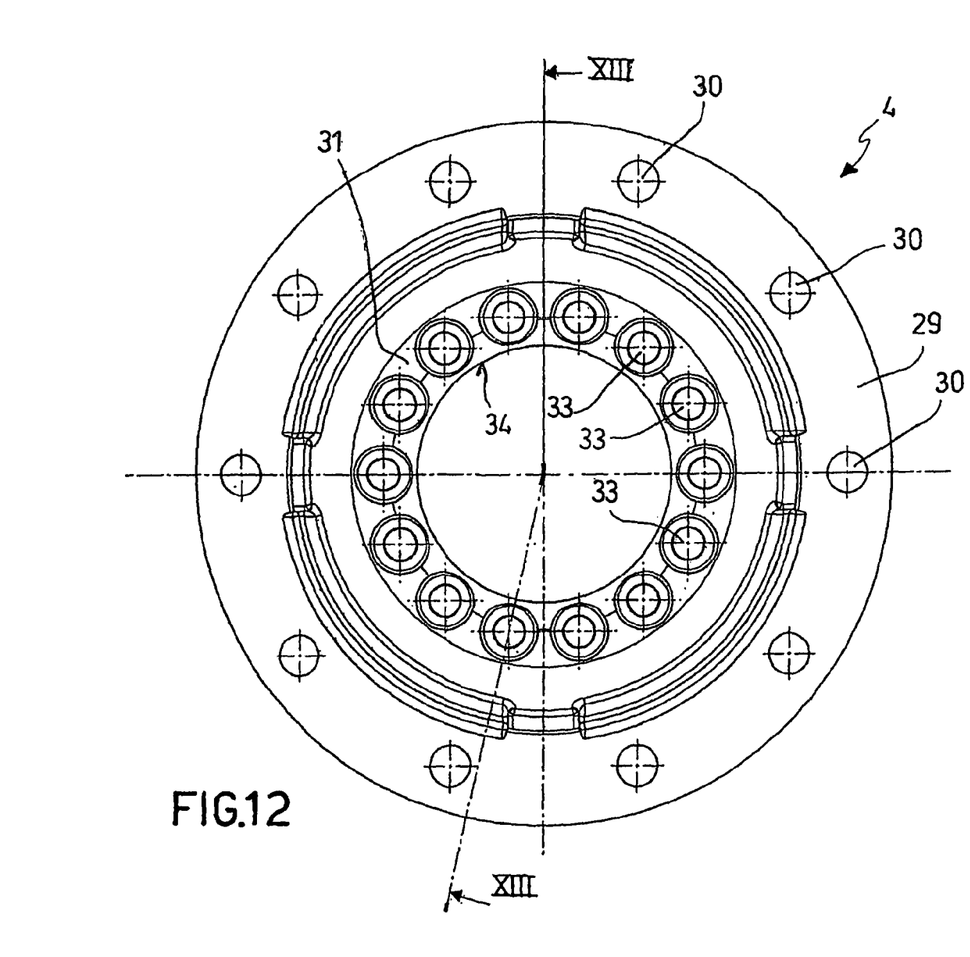
FIG. 12 is a front view of the supporting flange from FIG. 11.
Figure 13:
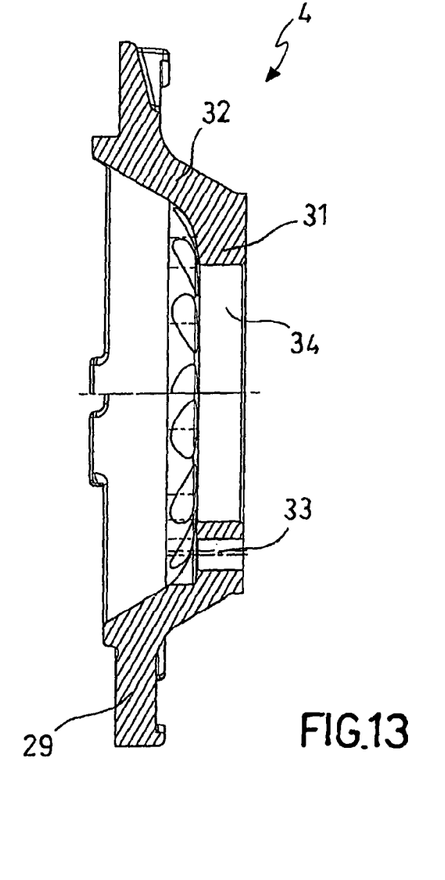
FIG. 13 is a sectional view according to line XIII-XIII from FIG. 12.
Figure 14:
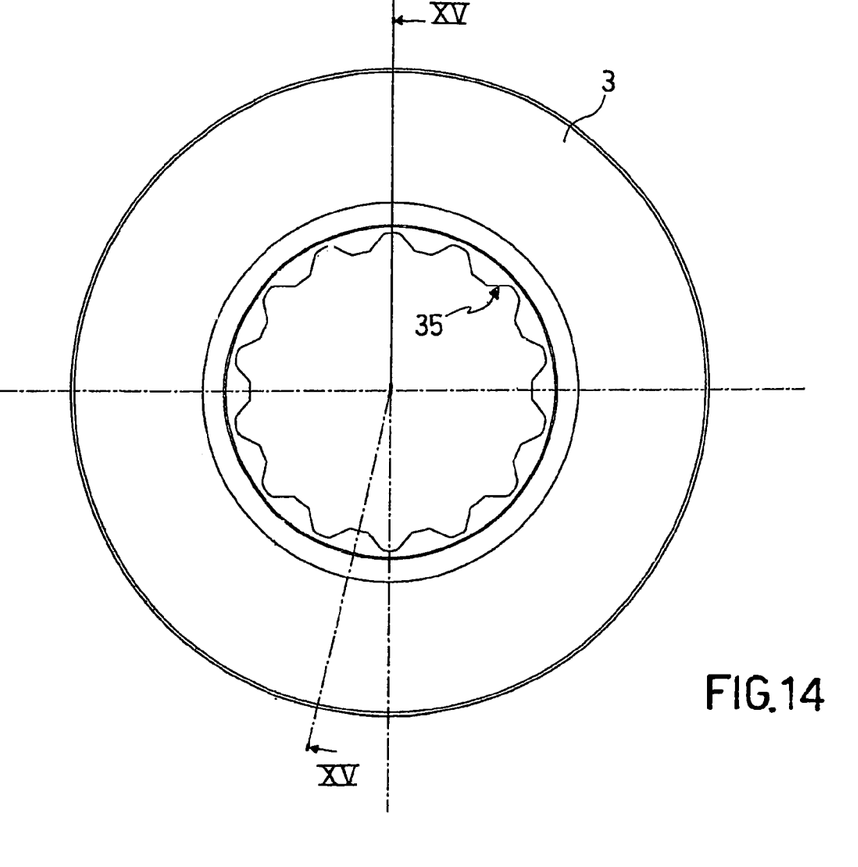
FIG. 14 is a front view of a braking band of a wheel carrier unit according to the invention.
Figure 15:
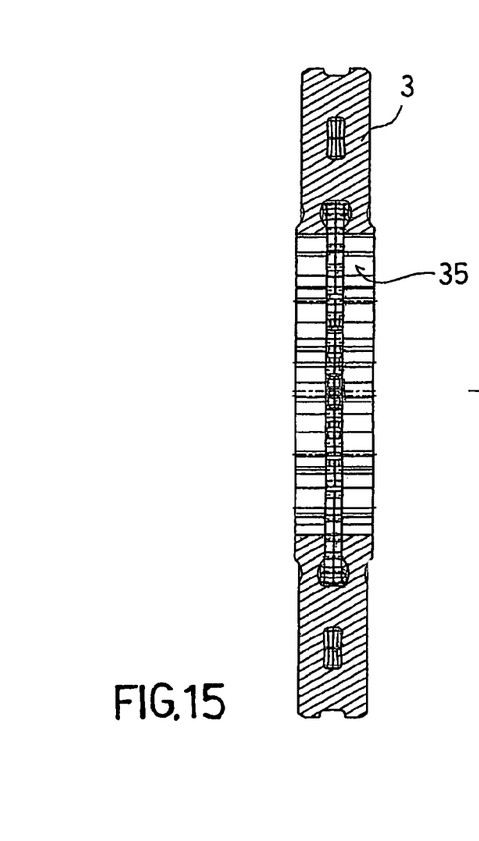
FIG. 15 is a sectional view according to line XV-XV from FIG. 14.
Figure 16:
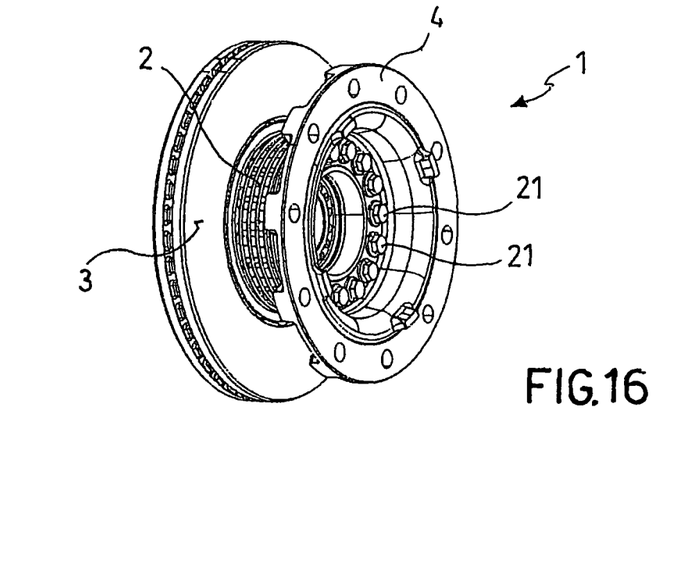
FIGS. 16 and 17 are perspective views of a wheel carrier unit according to a further embodiment of the invention.
Figure 17:
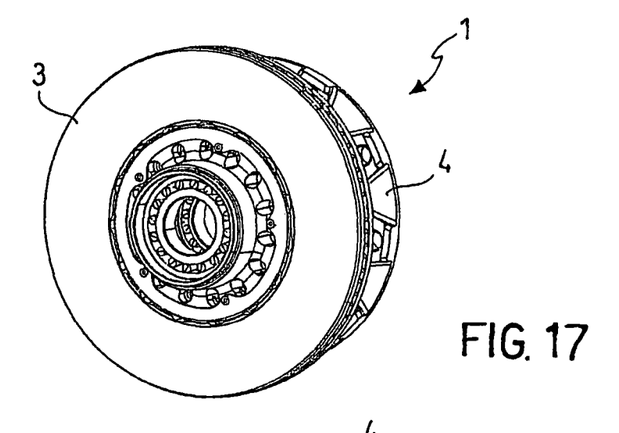
Figure 18:
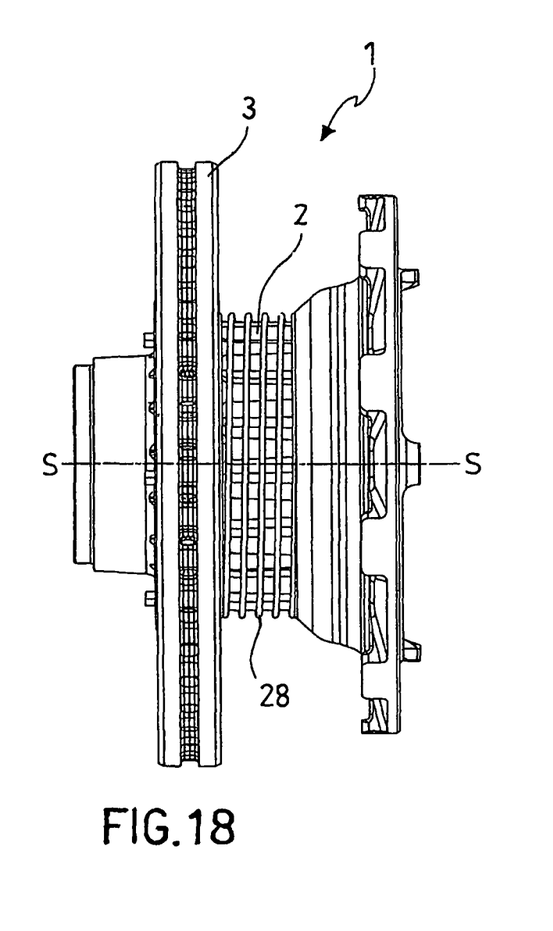
FIG. 18 is a side view of the wheel carrier unit from FIG. 16.
Figure 19:
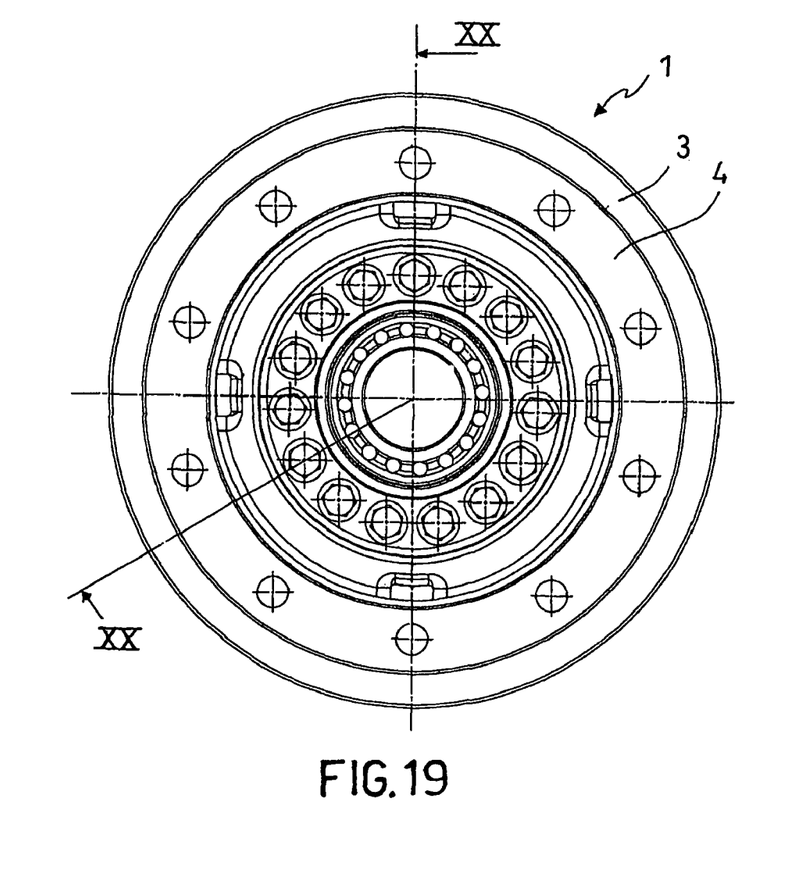
FIG. 19 is a front view of the wheel carrier unit from FIG. 16.

In accordance with the embodiment shown in FIG. 8, the engaging surface 23 comprises a plurality of projections 26 or grooves defining a plurality of cavities 27 or grooves therebetween and the cooling ducts 25 are provided in said cavities 27 or grooves and are provided with intake ports facing the hub side 17 of the support member 2. Thereby, the cooling ducts do not weaken the section of the support member 2 which defines the threaded holes 20.

In accordance with an advantageous embodiment, the wheel carrier 1 comprises elastic means in order to urge the braking band 3 in the axial direction to the engaging position with the seat 6. Advantageously, a helical spring 28 to be inserted from the wheel side 16 onto the support member 2 comprises a first end abutting against the connection flange 4 and a second end abutting against the braking band 3 such as to urge the latter to the engaging position with the seat 6. The spring 28 is either preloaded or pre-stressed by approaching and screwing the connection flange 4 to the support member 2.

According to an aspect of the present invention, the seat 8, 9 for connecting the support member 2 to the bearing 10, 11 i.e. the outer ring 12, 13 of the bearing 10, 11 is spaced from the threaded holes 20, such that the connection between the connection flange 4 and the support member 2 is actually independent from the connection between the support member 2 and the bearing 10, 11 i.e. the vehicle suspension.

Advantageously, the threaded holes 20 are radially spaced apart from the seat 8, 9 for accommodating the bearing outer ring and they axially extend, at least partially, in the area of this seat 8. This makes the wheel carrier structure very compact and strong and in the meantime it ensures the independence of said first and second connecting means.

In accordance with an embodiment, the threaded holes 20 are at least partially located in the radial projections 26 of the seat 6 for accommodating the braking band 3. This allows to restrict the radial size of the support member despite the overlapping of three connecting means: the seat 8 for the bearing, the seat 6 for the braking band and the threaded holes 20.

Advantageously, the threaded holes 20 axially extend only in an area outside the engaging position of the braking band 3 in the seat 6, such as to avoid a weakening of the section of the support member at the engaging position of the braking band 3.

With reference to the embodiment with two seats 8, 9 for bearings, a first seat 8 with a first bearing 10 is axially arranged within the area of the threaded holes 20 and, advantageously, a second seat 9 with a second bearing 11 is axially arranged within the engaging area of the braking band 3 with the support member 2. Thereby, a very rigid, compact and balanced wheel carrier being capable of transmitting the braking torque to the wheel without being subjected to excessive deformations and thus uniformly stressing all the involved structural components is provided.

The connection flange 4 comprises an outer annular flange 29 with a plurality of holes 30 for accommodating, preferably with interference, screws for removably connecting the wheel to the connection flange 4 and an inner annular flange 31 in which there are provided the through holes 33 being arranged aligned relative to the threaded holes 20 of the support member. The outer flange 29 and the inner flange 31 are connected to each other by means of a substantially truncated cone-shaped connecting area 32.

In accordance with an embodiment, the connection flange 4 comprises a supported portion 34 having a shape substantially complementary with the shape of the supporting portion 22 of the support member 2 and adapted to prevent the connection flange 4 from moving relative to the support member 2 in at least one transversal direction, preferably in all the directions being transversal to the axis S.

Advantageously, the supported portion 34 comprises a substantially circular or cylindrical seat centered relative to the axis S and suitable to accommodate the substantially cylindrical tubular projection 22 of the support member 2.

The operation mode of the wheel carrier unit for vehicles with a disc-brake will be described herein below.

For the first assembling there is provided a pre-assembly of the bearings 10, 11 and of a suitable spacer between their inner rings, the support member 2, the braking band 3 and the connection flange 4 for providing a single assembly which is mounted on the spindle before the caliper has been assembled.

The bearings 10, 11 will not be opened again throughout their whole life, as guaranteed by the manufacturers.

The wheel connection is carried out in a known manner by means of a plurality of nuts which are screwed onto the screws or "studs" of the outer flange 29 of the connection flange 4.

While braking, the braking moment is transmitted by means of the toothed surface 35 of the braking band 3 to the engaging surface 23 of the support member 2 and, from the support member 2 to the connection flange 4 due to the friction due to the clamping force of the screws 21. From the connection flange 4 the braking moment is transmitted to the wheel by means of the connection provided by the wheel connecting studs.

The replacement of a worn braking band is carried out, after the wheel has been disassembled from the connection flange 4 and the disc brake caliper has also been disassembled, by unscrewing the connection flange 4 from the support member 2, removing the helical spring 28 and extracting the braking band from the seat 6 in the axial direction towards the wheel side.

After the new braking band has been placed on the seat 6, the helical spring 28 and the connection flange 4 are placed, such that the helical spring, by abutting against the connection flange, urges the braking band in the relative engaging position against the striking surface 24. Finally, the screws 21 are tightened in order to fasten the connection flange to the support member. The caliper assembling can be carried out either before or after the connection flange has been fastened to the support member.

The wheel carrier for vehicles with a disc brake according to the invention has several advantages.

First of all, it allows the worn braking bands to be replaced without any action on the bearing.

The present invention further allows to optimise the different components independently from one another, both with reference to the structural material and with reference to the geometrical shape. Consequently, the thickness of the support member can be restricted as compared with the one of the prior art bells, thus achieving a decrease in weight and therefore a saving in materials.

Moreover, the connecting means between the support member and the bearings are not further stressed while braking.

The wheel carrier unit has a high strength, minimum size and an optimum stress distribution while the vehicle is operating and particularly while braking hard.

The assembling and replacing actions of the braking bands are quicker and thereby more cost-effective as compared with prior art.

FIG. 16 to 27 show further advantageous embodiments of the invention.

An embodiment provides a striking ring 36 to be removably fastened, for example by means of screws 43, to the support member 2, such that the striking ring forms the striking surface 24, thus making the support member more versatile to be used with different types of braking bands and reducing the manufacturing costs.

In accordance with a further embodiment, the cooling ducts comprise a circumferential groove 38 extending at least at intervals, preferably entirely around the engaging surface 23 thus separating the latter in two rings. The circumferential groove 38 is located in a position aligned with the position of the air ducts of the braking band 3 when the latter is in its engaging position with the seat 6 of the support member.

The cooling air can be conveyed from the outside to the circumferential groove 38 either through the above-mentioned ducts 25 or, preferably, through one or more ventilation through holes 39 provided in the support member which open in said circumferential groove 38.

Advantageously, the ventilation holes 39 also axially extend outside the seat 6.

Figure 20:
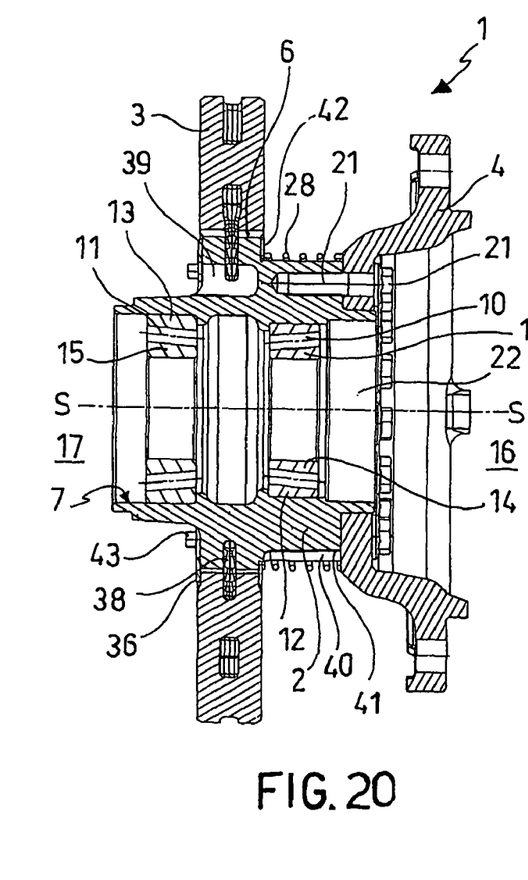
FIG. 20 is a sectional view according to line XX-XX from FIG. 19.
Figure 21:
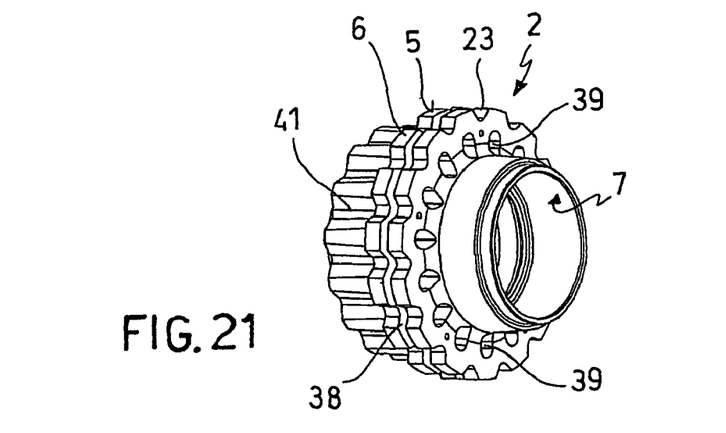
FIGS. 21 and 22 are perspective views of a support member of the wheel carrier unit according to a further embodiment of the invention.
Figure 22:
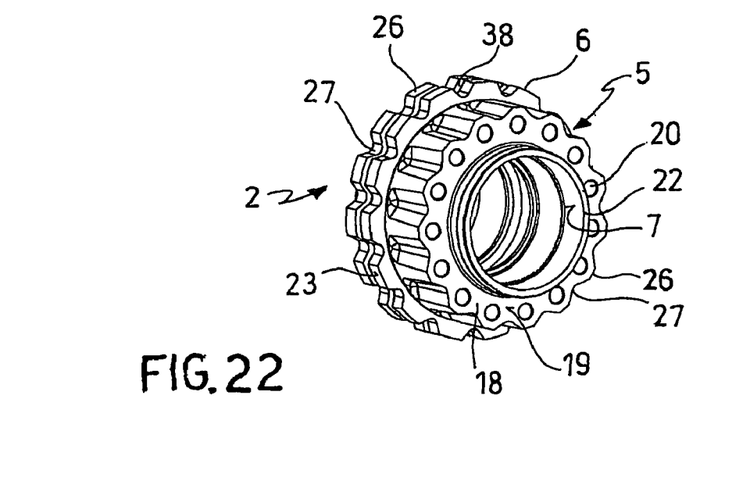
Figure 23:
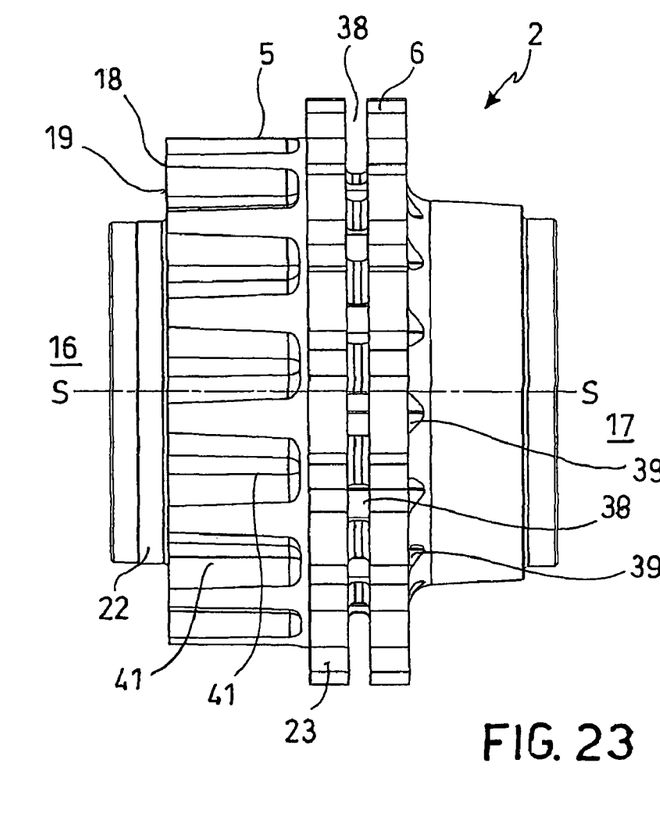
FIG. 23 is a side view of the support member from FIG. 21.
Figure 24:
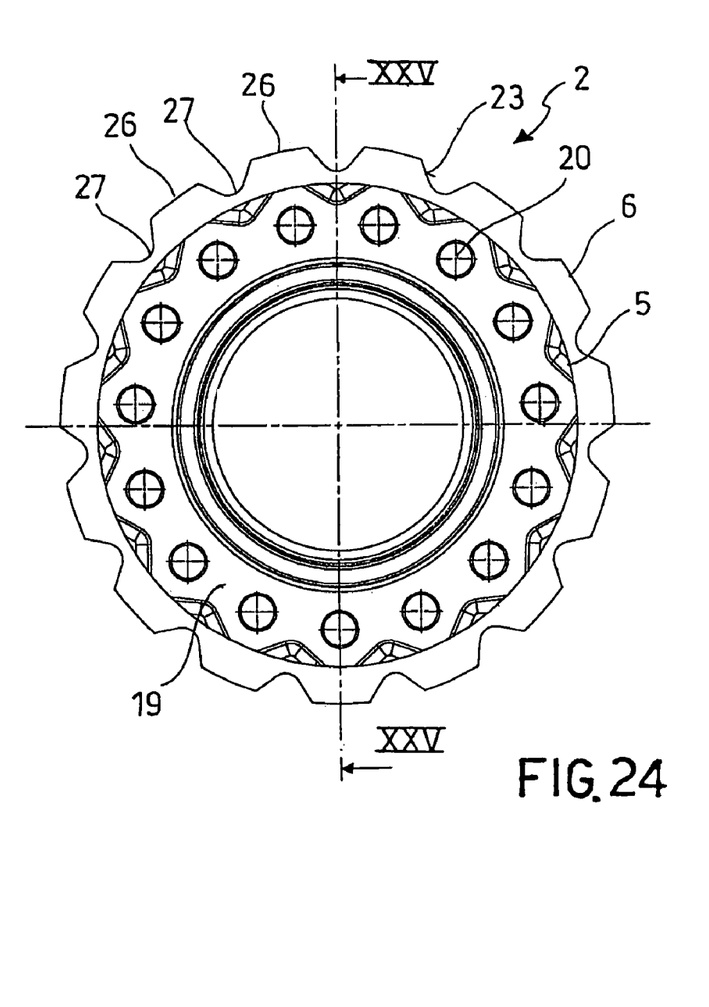
FIG. 24 is a front view of the support member from FIG. 21.
Figure 25:
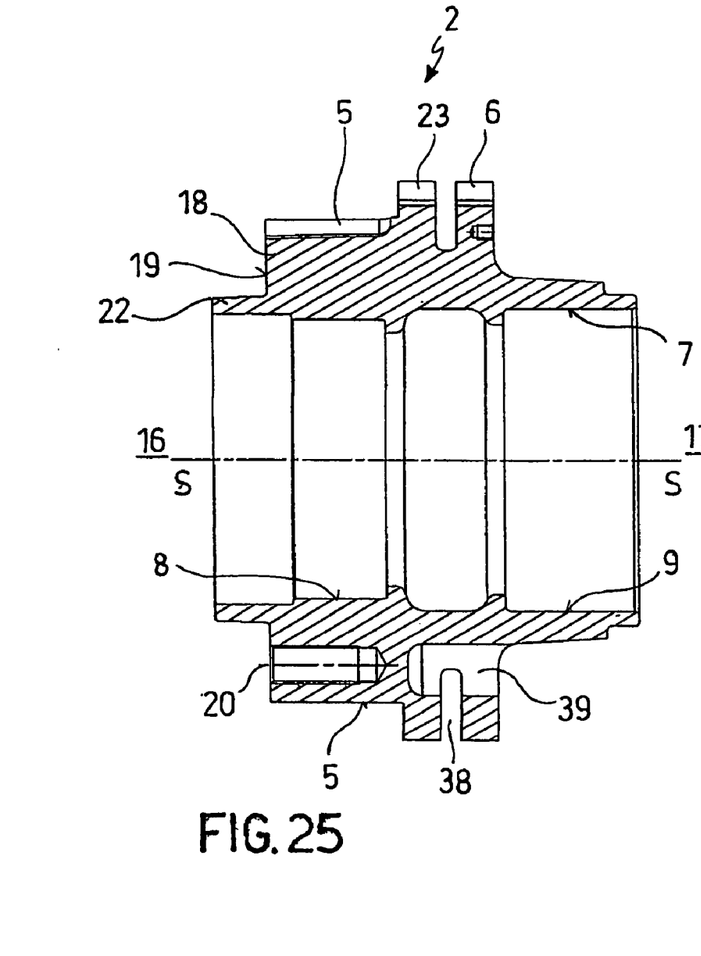
FIG. 25 is a sectional view according to line XXV-XXV from FIG. 24.
Figure 26:
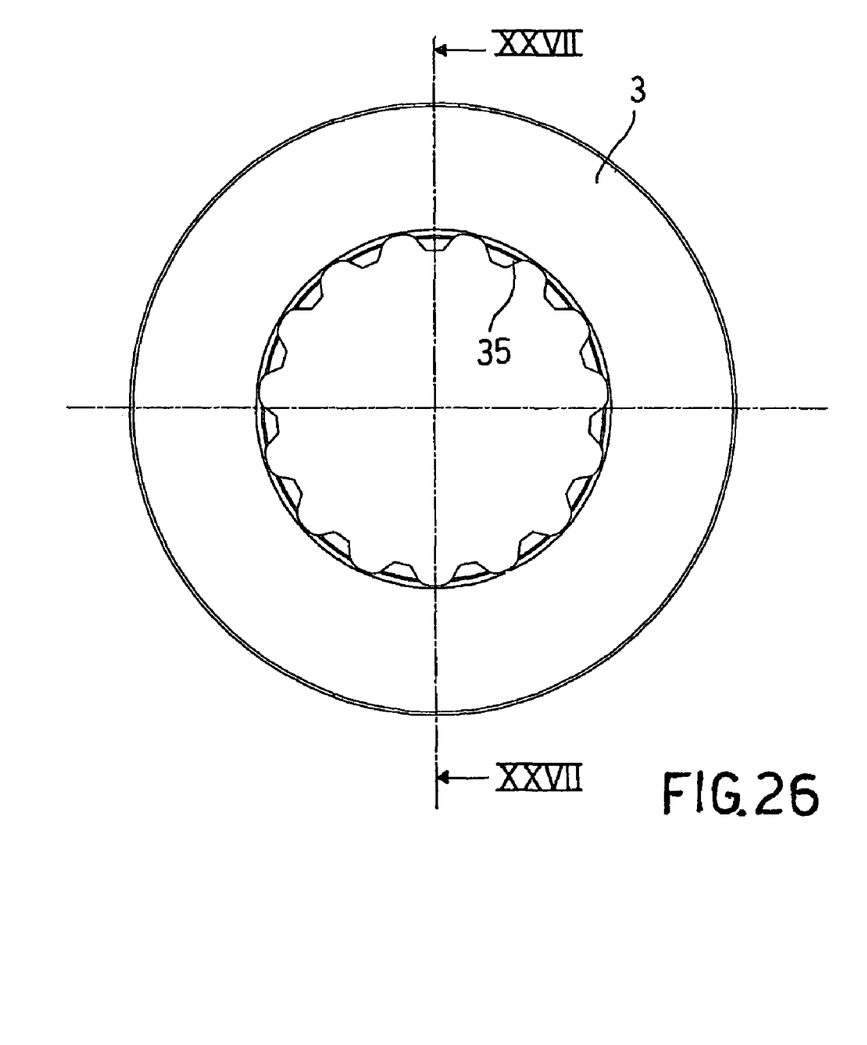
FIG. 26 is a front view of a braking band of a wheel carrier unit according to a further embodiment of the invention.
Figure 27:
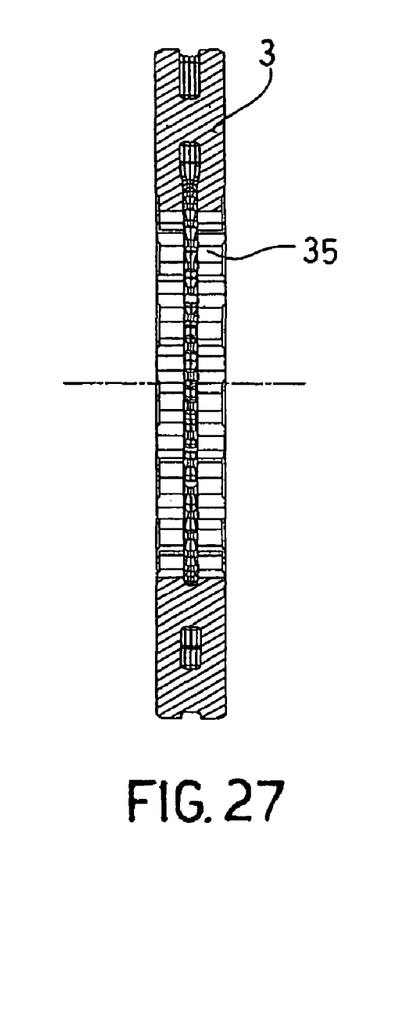
FIG. 27 is a sectional view according to line XXVII-XXVII from FIG. 26.

With a particular advantage, the ventilation holes lighten the support member in the case where, such as shown for example in FIG. 20, at the engaging position with the braking band 3, the seat 6 has an outside diameter greater than the outside diameter of the support member 2 adjacent to the seat 6. Thereby, a double effect has been achieved:

The annular area of the braking band, which contributes neither to the coupling with the seat 6 nor to the friction surface of the braking band, is eliminated thus making the latter more cost-effective and lighter.

A lightening of the radially enlarged area of the support member is achieved due to the ventilation holes 39.

In association with this particular embodiment, it is further advantageous to provide the seat 40 for the helical spring 28 with an outside diameter which is lower than the one of the seat 6, at least in the engaging position with the braking band 3.

As can be seen in the figures, the support member 2 is preferably further lightened due to lightening grooves or cavities 41, at the seat 40 for the helical spring 28.

In order to overcome the difference in diameter between the helical spring 28 and the braking band 3 it is further advantageous to interpose a thrust ring 42 between the spring and the braking band.

Obviously, to the wheel carrier unit for vehicles with disc brakes according to the present invention, those skilled in the art, aiming at satisfying contingent and specific needs, will be able to carry out further modifications and variants, all of them being contemplated within the scope of protection of the invention, such as defined in the claims below.

The invention claimed is:

1. A wheel carrier (1) intended to provide a rotary connection around an axis (S) between a wheel of a vehicle, which can be braked by means of a disc brake, and suspension means of the vehicle, comprising:
   a support member (2) adapted to support a braking band (3),
   a connection flange (4) adapted to support said wheel of the vehicle, wherein the support member (2) and the connection flange (4) are two separate parts,
   first connecting means (8, 9, 10, 11) in order to connect the support member (2) to the suspension means;
   second connecting means (20, 21, 33) in order to removably connect the connection flange (4) to the support member (2), characterized in that the first connecting means (8, 9, 10, 11) and the second connecting means (20, 21, 33) are functionally separate from one another, such that the connection between the connection flange (4) and the support member (2) is independent from the connection between the support member (2) and the suspension means;
   wherein the support member (2) comprises:
   (a) a shoulder (18) with a planar abutment surface (19) turned towards a wheel side (16) of the support member (2); and
   (b) a plurality of threaded holes (20) opening in the abutment surface (19) to accommodate a plurality of screws (21) for connecting the connection flange (4) and the support member (2) to each other; and
   (c) a seat (6) comprising a plurality of radial projections (26) and cavities (27) therebetween to rotatably and integrally accommodate the braking band (3); and
   (d) a tubular cylindrical support portion (22) in the support member (2) and protruding from said planar abutment surface (19);
   wherein the connection flange (4) is axially inserted over the support portion (22) and abutted against said abutment surface (19),
   and wherein said threaded holes (20) are formed in said abutment surface (19) radially outside of said cylindrical support portion (22), axially recessed with respect to the support portion (22), and at least partially provided in said projections (26).

2. The wheel carrier (1) according to claim 1, wherein the support member (2) is connected to at least one bearing (10, 11) and is splined to the suspension means.

3. The wheel carrier (1) according to claim 2, wherein the support member (2) is splined on the bearing (10, 11) by means of a shape- or an interference-coupling.

4. The wheel carrier (1) according to claim 1, wherein the support member (2) comprises a shoulder (18) with a planar abutment surface (19) being substantially perpendicular relative to the axis (S) and turned towards a wheel side (16) of the support member (2), the shoulder (18) being provided with a plurality of threaded holes (20) opening in the abutment surface (19) and being arranged aligned relative to corresponding through holes (33) of the connection flange (4), said threaded holes (20) and said through holes (33) being adapted to accommodate a plurality of screws (21) for connecting the connection flange (4) and the support member (2) to each other.

5. The wheel carrier (1) according to claim 4, wherein said threaded holes (20) and said through holes (33) are pitch-arranged along a circumference having the centre thereof on axis (S).

6. The wheel carrier (1) according to claim 1, wherein the support member (2) comprises a support portion (22) the shape thereof being substantially complementary with the shape of a supported portion (34) of the connection flange (4) and suitable to prevent the connection flange (4) from moving relative to the support member (2) in at least one direction transversal to axis (S).

7. The wheel carrier (1) according to claim 6, wherein said support portion (22) comprises one or more projections being located near the threaded holes (20).

8. The wheel carrier (1) according to claim 6, wherein the support portion (22) comprises one tubular protuberance being substantially cylindrical and centered relative to axis (S).

9. The wheel carrier (1) according to claim 1, wherein the support member (2) defines a seat (6) to accommodate the braking band (3), wherein said seat (6) has such a shape as to allow the braking band (3) to be inserted from the wheel side onto the support member (2) when the connection flange (4) is separate from the support member (2).

10. The wheel carrier (1) according to claim 1, wherein the seat (6) comprises a grooved engaging surface (23) suitable to engage a substantially complementary surface (35) of the braking band (3) in order to rotatably integrally connect the braking band (3) and the support member (2) to each other around the axis (S).

11. The wheel carrier (1) according to claim 9, wherein the seat (6) comprises a striking surface (24) being transversal to the axis (S) defining an engaging position for the braking band (3) in the seat (6).

12. The wheel carrier (1) according to claim 11, wherein the striking surface (24) restricts the axial displacement of the braking band (3) towards a hub side (17) of the support member (2).

13. The wheel carrier (1) according to claim 11, comprising a striking ring (36) to be removably fastened to the support member (2), wherein said striking ring forms said striking surface (24).

14. The wheel carrier (1) according to claim 9, wherein the seat (6) comprises one or more cooling ducts (25) allowing the air to be conveyed from outside the seat (6) up to the engaging position between the seat (6) and the braking band (3).

15. The wheel carrier (1) according to claim 14, wherein the cooling ducts (25) comprise grooves being provided in the engaging surface which also axially extend outside the seat (6).

16. The wheel carrier (1) according to claim 14, wherein the seat (6) comprises a plurality of projections (26) or grooves defining a plurality of cavities (27) or grooves therebetween and the cooling ducts (25) are provided in said cavities (27) or grooves.

17. The wheel carrier (1) according to claim 14, wherein the cooling ducts (25) are provided with intake ports facing the hub side (17) of the support member (2).

18. The wheel carrier (1) according to claim 14, wherein the cooling ducts comprise a circumferential groove (38) extending at least at intervals, preferably entirely around the engaging surface (23) in a position substantially aligned with the position of the air ducts of the braking band (3) when the latter is in its engaging position.

19. The wheel carrier (1) according to claim 18, comprising one or more ventilation through holes (39) provided in the support member (2) which open in said circumferential groove (38).

20. The wheel carrier (1) according to claim 19, wherein the ventilation holes (39) also axially extend outside the seat (6).

21. The wheel carrier (1) according to claim 1, comprising elastic means (28) suitable to urge the braking band (3) to one of its engaging positions with the seat (6).

22. The wheel carrier (1) according to claim 21, comprising a thrust ring (42) being interposed between the elastic means (28) and the braking band (3).

23. The wheel carrier (1) according to claim 1, comprising a spring (28) suitable to abut against the connection flange (4) and the braking band (3) for urging the braking band (3) into one of its engaging positions with the seat (6).

24. The wheel carrier (1) according to claim 21, wherein said elastic means comprise a helical spring (28) to be inserted from the wheel side (16) onto the support member (2).

25. The wheel carrier (1) according to claim 21, wherein said elastic means is pre-stressed between the connection flange (4) and the braking band (3), and wherein the pre-stressing is accomplished by screwing the connection flange (4) to the support member (2).

26. The wheel carrier (1) according to claim 1, wherein the seat (6) at the engaging position with the braking band (3) has an outside diameter which is greater than the outside diameter of the support member (2) being adjacent to the seat (6).

27. The wheel carrier (1) according to claim 26, comprising a seat (40) for the elastic means (28) having an outside diameter which is lower than the seat (6) in the engaging position with the braking band (3).

28. The wheel carrier (1) according to claim 1, wherein the support member (2) is substantially tubular with a radially outer surface (5) forming the seat (6) accommodating the braking band (3) and a radially inner surface (7) forming at least one seat (8, 9) for connecting the support member (2) and at least one bearing (10, 11) to each other.

29. The wheel carrier (1) according to claim 8, wherein the seat (8, 9) for connecting the support member (2) and the bearing (10, 11) to each other is spaced from the threaded holes (20), such that the connection between the connection flange (4) and the support member (2) is independent from the connection between the support member (2) and the bearing (10, 11).

30. The wheel carrier (1) according to claim 28, wherein an outer ring (12, 13) of the bearing (10, 11) is spaced from the threaded holes (20), such that the connection between the connection flange (4) and the support member (2) is independent from the connection between the support member (2) and the suspension means.

31. The wheel carrier (1) according to claim 30, wherein the threaded holes are radially distant from the seat (8, 9) for accommodating the outer ring (12, 13) of the bearing (10, 11), and extending in an axial manner, at least partially, to the area of the seat (8) for accommodating the outer ring (12) of the bearing (10).

32. The wheel carrier (1) according to claim 1, wherein the threaded holes (20) are at least partially provided in the projections (26) of the seat (6) for accommodating the braking band (3).

33. The wheel carrier (1) according to claim 1, wherein the threaded holes (20) axially extend only to an area outside the engaging position of the braking band (3) in the seat (6) for accommodating the braking band (3).

34. The wheel carrier (1) according to claim 1, wherein the support member (2) comprises a first seat (8) for accommodating an outer ring (12) of a first bearing (10) and a second seat (9) for accommodating the outer ring (13) of a second bearing (11), said first (8) and second (9) seats being axially opposite to each other, such that the first bearing (10) can be inserted into the first seat (8) from the wheel side (16) of the support member (2) and the second bearing (11) can be inserted into the second seat (9) from the hub side (17) of the support member (2).

35. The wheel carrier (1) according to claim 34, wherein the first seat (8) with the first bearing (10) is arranged axially within the area of the threaded holes (20).

36. The wheel carrier (1) according to claim 34, wherein the second seat (9) with the second bearing (11) is axially arranged within the engaging area of the braking band (3) with the support member (2).

37. The wheel carrier (1) according to claim 1, wherein the connection flange (4) comprises:
an outer annular flange (29) provided with a plurality of holes (30), being suitable to accommodate screws for removably connecting the wheel to the connection flange (4);
an inner annular flange (31) provided with a plurality of holes (33) being arranged aligned relative to the threaded holes (20) of the support member (2) adapted to accommodate a plurality of screws (21) for connecting the connection flange (4) and the support member (2) to each other.

38. The wheel carrier (1) according to claim 1, wherein the connection flange (4) comprises a supported portion (34), the shape thereof being substantially complementary with the shape of a supporting portion (22) of the support member (2) and suitable to prevent the connection flange (4) from moving relative to the support member (2) in at least one direction transversal to axis (S).

39. The wheel carrier (1) according to claim 38, wherein said supported portion (34) comprises a substantially circular or cylindrical seat centered relative to axis (S) and suitable to accommodate a substantially cylindrical tubular projection of the support member (2).

40. The wheel carrier (1) according to claim 37, wherein between the outer annular flange (29) and the inner annular flange (31) there is provided a substantially truncated cone-shaped connecting area (32).

41. A wheel carrier unit (1), comprising a wheel carrier (1) according to claim 1, as well as two bearings (10, 11) comprising an inner ring (14, 15), to be integrally connected to the suspension means and an outer ring (12, 13) rotatably associated to the inner ring, the outer ring of both bearings being accommodated in respectively one of two seats (8, 9) for accommodating the bearings of the support member (2).

42. A suspension for vehicles which can be braked with a disc brake, comprising either a wheel carrier (1) or a wheel carrier unit (1) according to claim 1.

* * * * *